United States Patent [19]

Krauss

[11] Patent Number: 4,761,860

[45] Date of Patent: Aug. 9, 1988

[54] TWO PART GROMMET WITH INTERENGAGING PROJECTIONS

[75] Inventor: Mark Krauss, Providence, R.I.

[73] Assignee: American Cord & Webbing Co., Inc., New York, N.Y.

[21] Appl. No.: 30,628

[22] Filed: Mar. 27, 1987

[51] Int. Cl.[4] .......................... A43C 5/00; F16B 21/00
[52] U.S. Cl. ........................................ 24/142; 411/339
[58] Field of Search ................... 24/142, 148; 411/339, 411/508, 509, 510, 512

[56] References Cited

U.S. PATENT DOCUMENTS

| | | | |
|---|---|---|---|
| 295,593 | 3/1884 | Thayer | 24/142 |
| 491,019 | 1/1893 | Manson | 411/339 |
| 612,848 | 10/1898 | Kempshall | 24/142 |
| 697,344 | 4/1902 | Leland | 411/339 |
| 2,132,950 | 10/1938 | Green | 411/339 |
| 2,154,012 | 4/1939 | Rhodes | 411/339 |
| 2,174,521 | 10/1939 | Lancaster | 411/339 |
| 2,614,729 | 10/1952 | Jung | 411/339 |
| 2,797,605 | 7/1957 | Metze, Jr. et al. | 411/339 |
| 3,494,246 | 2/1970 | Hensley | 411/339 |

FOREIGN PATENT DOCUMENTS

| | | | |
|---|---|---|---|
| 57008 | 10/1952 | France | 411/339 |
| 1176422 | 4/1959 | France | 411/339 |
| 1332688 | 6/1963 | France | 411/339 |
| 10420 | 6/1898 | United Kingdom | 24/142 |

*Primary Examiner*—Victor N. Sakran
*Attorney, Agent, or Firm*—Kane, Dalsimer, Sullivan, Kurucz, Levy, Eisele, and Richard

[57] ABSTRACT

A grommet comprises a pair of mating telescoping halves with each half comprising a tubular body and a flange extending radially outward therefrom. The body of one half is disposed over and about the body of the other half. The flange on one half is spaced from the flange on the other half. The inner surfaces of the outer body includes a radially inwardly extending projection and the outer surface of the inner body includes at least one recess receiving the projection for securing one half relative to the other to form the grommet.

14 Claims, 2 Drawing Sheets

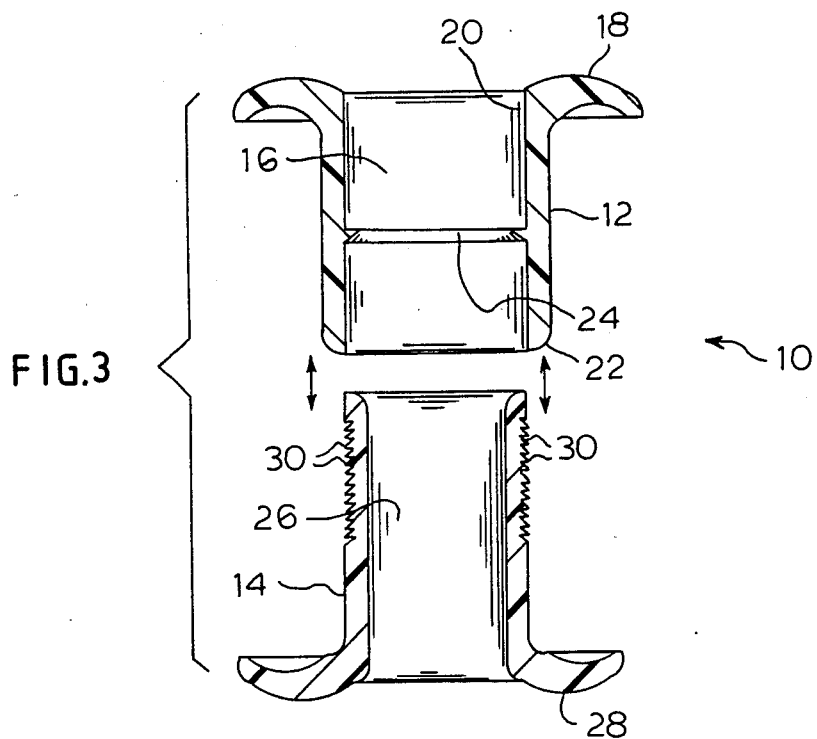
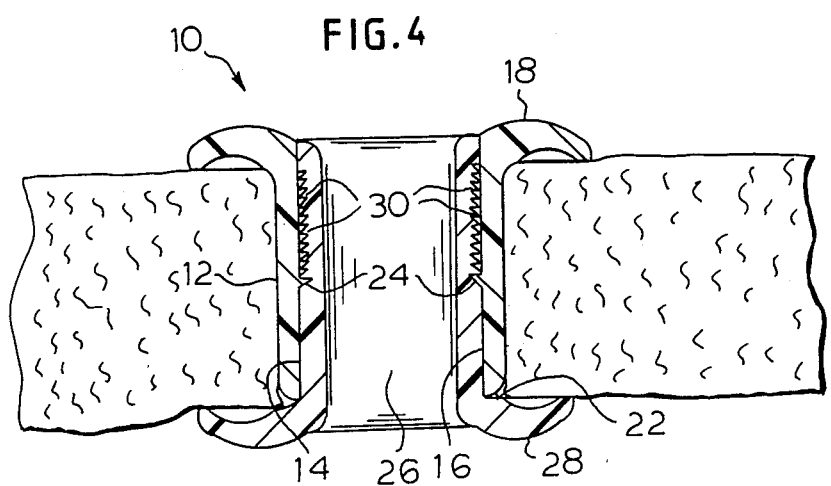

TWO PART GROMMET WITH INTERENGAGING PROJECTIONS

BACKGROUND OF THE INVENTION

In the textile and related industries grommets are frequently utilized particularly in providing an opening or passageway for cord or lace. It is not uncommon to use metal for such grommets but there is the attendant disadvantage of such material rusting. Metal grommets now have to be assembled by hand but mostly with a machine that because of the stiffness of the metal requires bending of the metal.

SUMMARY OF THE INVENTION

It is a principal object of this invention to provide an improved grommet of relatively simple and inexpensive construction that may be easily installed and permanently affixed.

The present invention provides unique ratcheting or interlocking tooth pattern, which provides a one way locking action. The use of plastics enable the variation of shape of gripping surface including a tooth pattern into the flange of the grommet. Due to the length of the locking teeth, this stabilizes the two part assembly longitudinally and horizontally. In addition, the locking teeth design enables the grommet to be used over an extremely wide variety of different thickness of material, and also at the same time, provides similar strength to metal grommets without requiring an assembly machine. However, due to the ratcheting interlock tooth design, the plastic parts may be assembled by hand or with a light weight soft hammer.

The molding procedure would enable the custom design of any flange contour that the customer would require. A tooth pattern under each flange may also be provided to grip the fabric with which the grommet would be used. This would be extremely difficult if not impossible with metal.

BRIEF DESCRIPTION OF THE FIGURES

FIG. 3 is an exploded sectional view of the two pieces of the grommet prior to assembly;

FIG. 4 is a sectional view with the parts assembled and the selected material disposed between the flanges;

DETAILED DESCRIPTION

Figure 1:
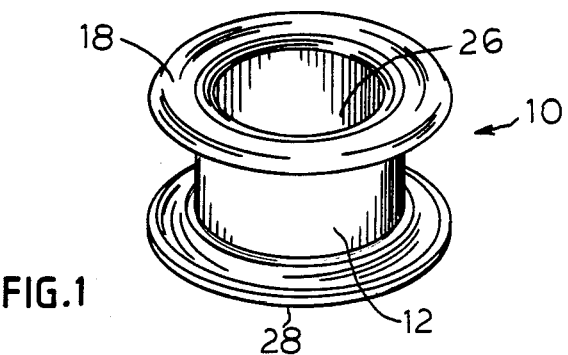
FIG. 1 is a perspective view of a circular 2-piece, grommet according to the present invention.
Figure 5:
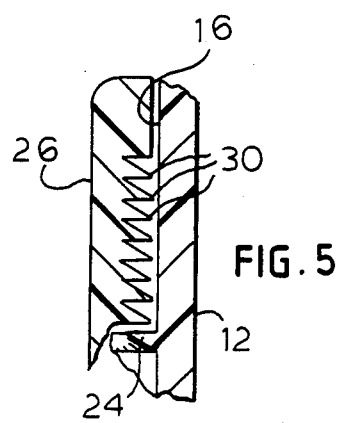
FIG. 5 is an enlarged fragmentation sectional view of the latching mechanism for the two assembled grommet parts.

In the drawings, a grommet 10 molded of any suitable resin or manufactured from any other material desired for a particular application. Grommet 10 is comprised of a pair of mating outer and inner parts in halves 12 and 14, respectively.

Figure 2:
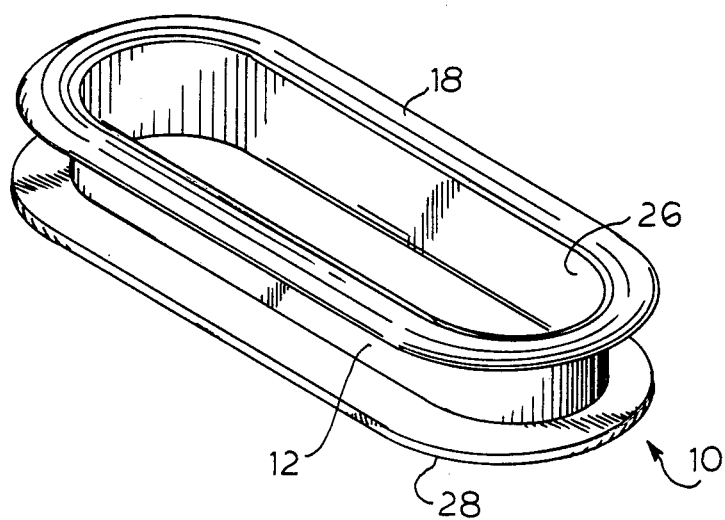
FIG. 2 is a perspective view of an oval, 2-piece grommet according to the present invention.
Figure 6:
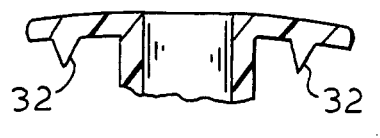
FIG. 6 is an enlarged fragmentary sectional view of an alternative embodiment which includes a tooth on the underside of at least one flange to increase the gripping action with the material between the flanges.

The outer half 12 includes a tubular body 16 and an integral lateral flange 18 extending outwardly from one end 20. The other end 22 is curved to nest neatly within surfaces of the inner half 14. Flange 18 which may assume many configurations or shapes is illustrated as being formed in a convex-concave configuration not only for aesthetic purposes but to increase the engagement and grip with the fabric or material with which it is associated. In order to facilitate its securement with the inner half 14, the outer half 12 is provided with a radially inwardly extending lug or projection 24 which may be circumferentially continuous or interrupted. In the embodiment of FIG. 2 it may be a straight tooth bar on the straight side.

The inner half 14 also includes a tubular body 26 having an OD approximately or slightly less than the ID of the tubular body 16 of the outer half 12. As shown in FIG. 4, outer and inner halves 12 and 14 respectively preferably contact each other along the smooth surfaces thereof, when assembled, for support against horizontal and rotational movement. A radial flange 28 extends outwardly from one end of the tubular body 26 and possesses a concave-convex configuration. At its other end, the body 26 is curved to eliminate any sharp edge when it is disposed adjacent the flange 18. For purposes of cooperation with the radially inwardly extending projection 24 of the outer half 12, the inner half is formed with a series of concentric recesses, serrations or similar mating surfaces 30 that receive the projection 24. In this regard, the invention contemplates other locking tooth patterns and interference or interengagement surfaces that will permit assembly of the halves 12 and 14 but prevents their separation. For example, a three point locking tooth pattern or a three point interlocking or interference type of fit may be used.

The grommet halves 12 and 14 are, as stated initially, separately manufactured or molded and are assembled prior or subsequent to association with the intended fabric or material usually with an accommodated hole or recess. In certain applications the grommet could be manufactured to pierce or cut a hole in the fabric at the time of use with fabric. In order to assemble the grommet 10, the tubular bodies 16 and 26 are telescopedly associated by sliding the outer body 16 over the inner body 26 or vice versa. This movement is continued with the projection 24 riding or coming over the serrations 30 until the desired extent of telescoping relationship is attained and the projection 24 rests in an accommodating recess. When this occurs the grommet 10 will be permanently fixed or anchored in place and the halves 12 and 14 cannot become disassociated because the projection 24 is locked or latched in its accommodating recess of serration 30.

It should be understood that the halves 12 and 14, and, particularly, the tubular bodies 16 and 26 may be circular, oval or any other appropriate cross-sectional configuration.

As an alternative embodiment, one or both flanges may include a tooth 32 to cooperate in providing increased gripping of material disposed between the flanges.

Although several somewhat preferred embodiments have been disclosed and described in detail herein, it should be understood that this invention is in no sense limited thereby and its scope is to be determined by that of the appended claims.

I claim:

1. A grommet comprising a first and second half, each half comprising a tubular body composed of a resinous material with the body of the first half being disposed over and about the body of the second half, the tubular body of the first half having an inner surface comprising a smooth portion which is substantially flat and a portion having inwardly directed projection means and the tubular body of the second half having an outward surface having a smooth portion which is substantially flat and a portion having outwardly directed projection means for engaging the projection means of the first half, wherein the smooth portions of the first and second halves contact each other providing lateral and rotational support for the coupling of the halves and wherein each half further comprises a gripping means for contacting material into which the grommet is fastened.

2. The invention in accordance with claim 1 wherein the outer and inner body including at least one radially extending projection.

3. The invention in accordance with claim 2 wherein the inner surfaces of the outer body including a radially inwardly extending projection and the outer surface of the inner body including at least one recess receiving the projection.

4. The invention in accordance with claim 3 wherein the outer surface of the inner body is serrated.

5. The invention in accordance with claim 4 wherein the projection and the recesses of the serrations are circumferentially continuous.

6. The invention in accordance with claim 4 wherein the projection and the recesses of the serrations are discontinuous.

7. The invention in accordance with claim 1 wherein the bodies are circular in cross section.

8. The invention in accordance with claim 1 wherein the bodies are oval in cross section.

9. The invention in accordance with claim 1 where each half is independently molded from a resin.

10. The invention in accordance with claim 1 wherein at least one flange has at least one tooth extending towards the other flange to facilitate gripping of material disposed between the flanges.

11. The invention in accordance with claim 10 wherein the at least one tooth is located on the flange at a point between the radially outward flange edge and the point of connection of the flange to the tubular body.

12. The invention in accordance with claim 1 wherein the inner surface of the tubular body of the first half and the outer surface of the tubular body of the second half further comprises an additional smooth portion, the projection means on each surface being located between the smooth portions and the additional smooth portion, the additional smooth portions contacting each other for further lateral and rotational support for the coupling of the halves.

13. The invention in accordance with claim 1 wherein the gripping means comprises a flange extending radially outwardly from the tubular body of each half.

14. The invention in accordance with claim 12 wherein the second half contains a rounded portion at the juncture of the tubular body and the flange, and the edge of the tubular body of the first half, distal to the gripping means, are rounded so that the rounded edges of the first half nest into the rounded portion of the second half.

* * * * *